United States Patent [19]
Guest

[11] 3,742,534
[45] July 3, 1973

[54] BOAT LAUNCHING AND BEACHING DEVICE

[76] Inventor: Rex McLean Guest, 754 Chiddington Avenue, London, Ontario, Canada

[22] Filed: Oct. 8, 1971

[21] Appl. No.: 187,738

[52] U.S. Cl. ................................................ 9/1 T
[51] Int. Cl. ............................................ B63c 13/00
[58] Field of Search ................. 9/1 T; 115/1 R; 280/150 A; 9/2 A

[56] References Cited
UNITED STATES PATENTS
2,393,296  1/1940  Darby .................................. 9/1 T
3,191,571  6/1965  Rex ..................................... 115/1 R
3,107,643  10/1963  Edwards ............................... 115/1

Primary Examiner—Milton Buchler
Assistant Examiner—Stuart M. Goldstein
Attorney—Peter Kirby et al.

[57] ABSTRACT

The device includes a frame for supporting a boat, the frame supporting at least two inflatable rollers that can act as wheels when inflated so that the device forms a vehicle to convey the boat into and out of the water. With the rollers inflated, the device has positive buoyancy so as to engage the hull of the boat. By partially or completely deflating the rollers, the device can be brought to negative buoyancy, so as to drop away from the bottom of the boat after launching, or conversely to enable it to be moved along the bottom to a position beneath the boat prior to reinflation of the rollers and engagement of the boat for beaching.

2 Claims, 3 Drawing Figures

PATENTED JUL 3 1973
3,742,534
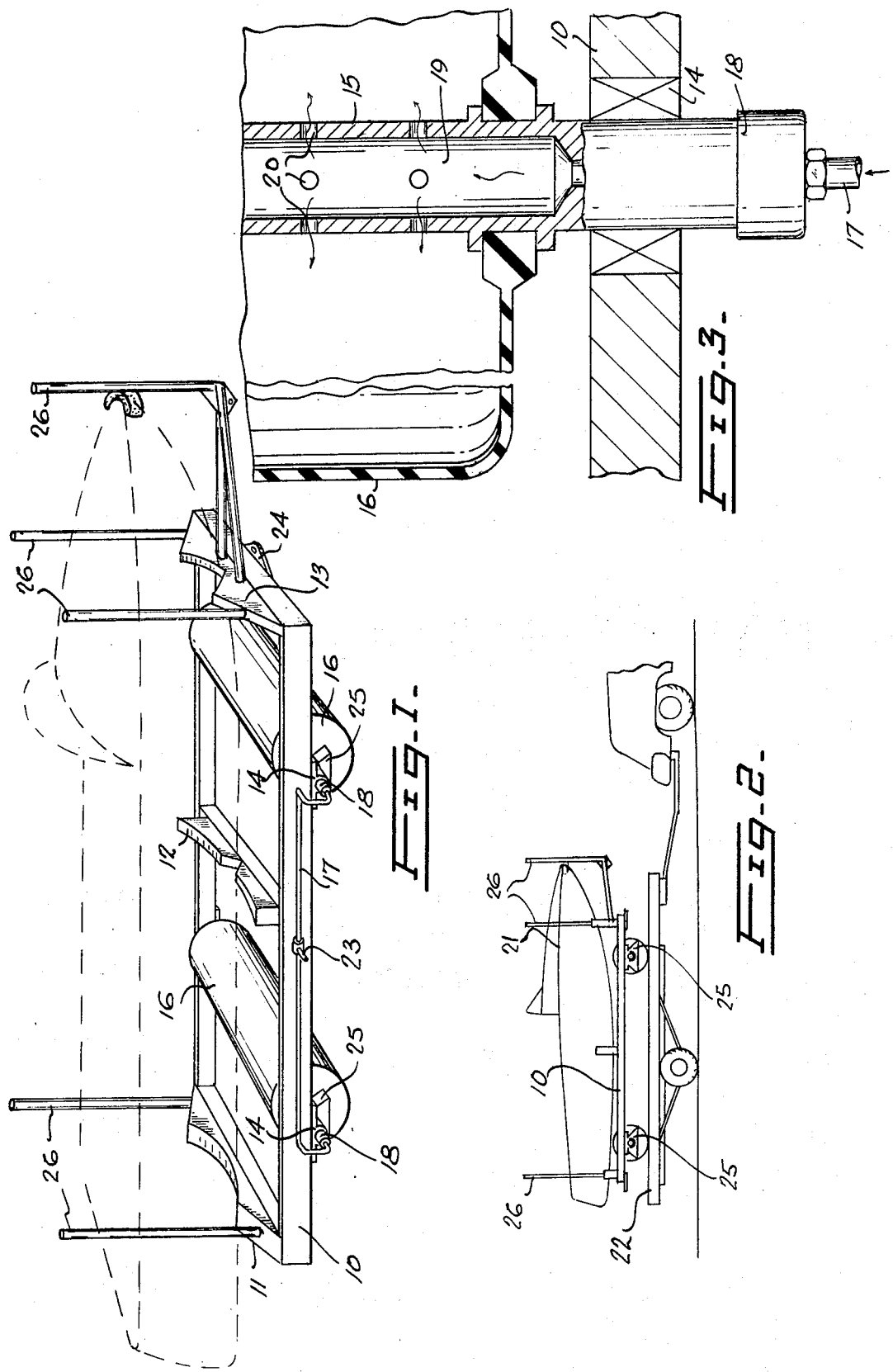

BOAT LAUNCHING AND BEACHING DEVICE

This invention relates to a device useful in the launching and beaching of boats, and has for its object the provision of an improved and simplified construction.

In accordance with the invention the device comprises:

a. a frame including means for supporting a boat thereon, b. and at least two inflatable rollers mounted on said frame to project downwardly therefrom when fully inflated to form wheels for enabling the device to travel over a surface, c. the device having positive buoyancy when said rollers are fully inflated and negative buoyancy when said rollers are at least partially deflated.

An embodiment of the invention is illustrated in the accompanying drawings. It is to be understood that this illustration and the description thereof are provided by way of example only, and not as limiting the broad scope of the invention, which latter is defined in the appended claims.

In the drawings:

FIG. 1 is a perspective side view of a launching device constructed in accordance with the invention;

FIG. 2 is a side view illustrating the manner in which this device may be used in association with a trailer and an automobile; and FIG. 3 is an enlarged, fragmentary and partially sectional view.

The launching device comprises a rigid frame 10 carrying typical boat-supporting cradles 11, 12 and 13 at its ends and center and padded posts 26 which will project above the surface of the water. The frame 10 also supports by means of bearings 14 a pair of shafts 15 on which are mounted inflatable rollers 16. These rollers 16 may be formed of rubber, canvas covered rubber or other air tight fabric. Air conduits 17 secured to one side of the frame 10 communicate via air tight, rotatable seals 18 with the interior 19 of each shaft 15 and hence via holes 20 to the interior spaces of the rollers 16 themselves. While two such rollers 16 are illustrated, more than two can be used.

For transportation, the device with a boat 21 mounted thereon can be placed on a trailer 22, the rollers 16 having been inflated from a source of pressure air (not shown) through a valve assembly 23 that communicates with the conduits 17. Then the air may be allowed to escape from or pumped from the rollers to allow the frame to sit solidly on feet 25 on the bed of the trailer.

When the launching site is reached, the rollers can be inflated and the device with the boat mounted on it will be removed from the trailer 22, either manually or by means of a winch and cable that can be connected to one of a pair of lugs 24 provided at each end of the frame 10. The rollers 16 now act as wheels. In this manner the launching device can be pushed or otherwise drawn down an inclined launching surface to enter the water. The air in the rollers 16 will cause the device to have positive buoyancy at this time, so that, as soon as sufficiently deep water has been reached, the entire assembly will float. At this time the valve 23 (or if preferred a valve elsewhere in the air supply and remote from the device itself) is actuated to allow air to escape from or be pumped from the rollers 16, at least to an extent sufficient to cause the device now to have negative buoyancy and hence drop away from the bottom of the boat which is now left floating clear. The launching device can then be hauled out of the water manually or by cable after inflating the rollers. Conversely the rollers may be completely deflated to allow the frame to sit solidly on its feet 25 and not be moved by wave motion, until time to beach the boat. Normally, the rollers will not require to be fully deflated to lose buoyancy and they may still act in some measure as wheels.

For beaching the boat, the reverse procedure is adopted, the boat first being moved to the proper position between the posts 26 before the rollers are inflated to give the device positive buoyancy and to bring it up tightly under the boat, whereupon the entire assembly can be winched out of the water, the rollers 16 again acting as wheels as soon as they touch bottom. In the same manner, the assembly can be moved back onto the trailer 22 or otherwise conveyed to storage.

While the device has been designed primarily for launching boats, as will be apparent it can act as a cart or like vehicle for the transporation of other articles.

I claim:

1. A boat launching and beaching device comprising:

a. a frame including means for supporting a boat thereon, b. at least two inflatable rollers formed of a flexible material mounted on said frame, c. and means including valve means for admitting air to said rollers to inflate the same, said rollers projecting downwardly from said frame when fully inflated to form wheels for enabling the device to travel over a surface, d. the device having positive buoyancy when said rollers are fully inflated and negative buoyancy when said rollers are at least partially deflated by release of air therein by operation of said valve means.

2. A device according to claim 1, including feet mounted on said frame for supporting the same when said rollers are deflated.

* * * * *